United States Patent
Choi (10) Patent No.: US 8,001,289 B2
(45) Date of Patent: Aug. 16, 2011

(54) DIGITAL AUDIO/VIDEO APPARATUS AND METHOD THAT CAN PERFORM ADDITIONAL OPERATIONS

(75) Inventor: Yong-hun Choi, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1524 days.

(21) Appl. No.: 10/876,515

(22) Filed: Jun. 28, 2004

(65) Prior Publication Data

US 2005/0008345 A1    Jan. 13, 2005

(30) Foreign Application Priority Data

Jul. 1, 2003 (KR) .................. 10-2003-0044245
Jul. 2, 2003 (KR) .................. 10-2003-0044535

(51) Int. Cl.
*G06F 3/00*      (2006.01)
*G06F 13/00*    (2006.01)

(52) U.S. Cl. .................. 710/15; 710/8; 710/22; 710/38

(58) Field of Classification Search .................. None
See application file for complete search history.

(56) References Cited

U.S. PATENT DOCUMENTS

| | | | |
|---|---|---|---|
| 2001/0047517 A1* | 11/2001 | Christopoulos et al. | 725/87 |
| 2002/0057893 A1* | 5/2002 | Wood et al. | 386/46 |
| 2002/0129357 A1 | 9/2002 | Stumm | |
| 2003/0076655 A1* | 4/2003 | Lien et al. | 361/686 |

FOREIGN PATENT DOCUMENTS

| | | |
|---|---|---|
| JP | 2000-358207 | 12/2000 |
| KR | 2000-51331 A | 8/2000 |
| KR | 2002-0064436 | 8/2002 |
| KR | 2003-47527 A | 6/2003 |

OTHER PUBLICATIONS

Korean Official Action issued on Jun. 21, 2005, for Korean Patent Application No. 2003-44245 (listing 2 references).

* cited by examiner

*Primary Examiner* — Tariq Hafiz
*Assistant Examiner* — Scott Sun
(74) *Attorney, Agent, or Firm* — Stanzione & Kim, LLP (57) ABSTRACT

An audio/video (AV) apparatus such as a digital television set and a digital set-top-box device, which can perform additional operations such as an electronic album, MP3 and FIMS, and an additional operation performing apparatus appropriate for the digital AV apparatus. The digital AV apparatus can include an AV decoder to output video and audio data, a scaler to adjust resolutions of video data output from the AV decoder and additional information video data provided from an external video source and to output the adjusted resolution, an audio processor to process audio data output from the AV decoder and additional information audio data provided from an external audio source, and a controller to receive a command provided from an external commander and to control a selection operation of the scaler and the audio processor based on the command.

10 Claims, 9 Drawing Sheets

24 PIN DVI
FEMALE CONNECTOR

DIGITAL AUDIO/VIDEO APPARATUS AND METHOD THAT CAN PERFORM ADDITIONAL OPERATIONS

CROSS-REFERENCE TO RELATED APPLICATIONS

This application claims the priority of Korean Patent Applications No. 2003-44245, filed on Jul. 1, 2003, and No. 2003-44535, filed on Jul. 2, 2003, in the Korean Intellectual Property Office, the disclosure of which is incorporated herein in its entirety by reference.

BACKGROUND OF THE INVENTION

1. Field of the Invention

The present general inventive concept relates to an audio/video (AV) apparatus such as a digital television set and a digital set-top-box device, which has a structure to perform additional operations to smoothly implement an electronic album, an MP3 player, a FIMS (Family Information Management System), and an additional operation performing apparatus to perform other operations appropriate for the digital AV apparatus.

2. Description of the Related Art

Digital AV apparatuses such as digital television sets and digital set-top-box devices that process digitized image data are widely distributed.

The digital AV apparatuses are installed and used indoors, and thus it would be desirable if such apparatuses could perform additional operations such as an electronic album, MP3 and FIMS (Family Information Management System), and a camera operation, in addition to a broadcasting reception operation.

However, there is no digital AV apparatus that performs such additional operations in the conventional art. As a result, users cannot easily connect a MP3 player, a camera, etc., to a digital AV apparatus in order to perform the additional operations.

As a result, since these independent apparatuses are not connected to each other, each apparatus cannot be controlled integrally and automatically. Users have been inconvenienced since they are required to control each additional apparatus separately.

SUMMARY OF THE INVENTION

The present general inventive concept provides a digital audio/video (AV) apparatus having an improved structure that can easily perform various additional operations such as an electronic album, MP3, FIMS (Family Information Management System), and a digital camera.

The present general inventive concept also provides an additional operation performing apparatus that is linked with the digital AV apparatus and performs various additional operations.

Additional aspects and advantages of the present general inventive concept will be set forth in part in the description which follows and, in part, will be obvious from the description, or may be learned by practice of the general inventive concept.

The foregoing and/or other aspects of the present general inventive concept can be achieved by providing a digital audio/video (AV) apparatus including an AV decoder to decode a received encoded video stream, and to output video and audio data; a microprocessor which controls a decoding operation of the AV decoder or processes additional information data provided from a controller; a ROM which stores programs to control the microprocessor; a RAM which stores data used by the microprocessor; a scaler to adjust a resolution of video data output from the AV decoder and to output the adjusted resolution; an audio codec that processes audio data output from the AV decoder; a USB reader which reads out additional information data such as the video data, MP3 data, FIMS data which is stored in the memory card; and a controller which supplies the additional information data input from the USB reader to the microprocessor.

The foregoing and/or other aspects of the present general inventive concept can also be achieved by providing a digital AV apparatus including: an AV decoder which outputs video and audio data; a scaler to adjust resolutions of video data output from the AV decoder and additional information video data provided from an external video source and to output the adjusted resolution; an audio processor to process audio data output from the AV decoder and additional information audio data provided from an external audio source; and a controller which receives a command provided from an external commander and controls a selection operation of the scaler and the audio processor based on the command.

The digital AV apparatus may receive the additional information video and audio data through a DVI interface.

The foregoing and/or other aspects of the present general inventive concept can also be achieved by providing an additional operation performing apparatus including a remote receiver which receives a remote command from a user; an additional operation controller which controls programs to perform additional operations and controls additional information data such as additional information video and audio data to be output externally; a bridge which receives a remote control signal or the additional information data provided from the remote receiver and provides the received result to the additional operation controller; a RAM which stores the additional information data provided from the bridge; and a ROM which stores the programs which execute the additional operations and executed by the additional operations controller.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
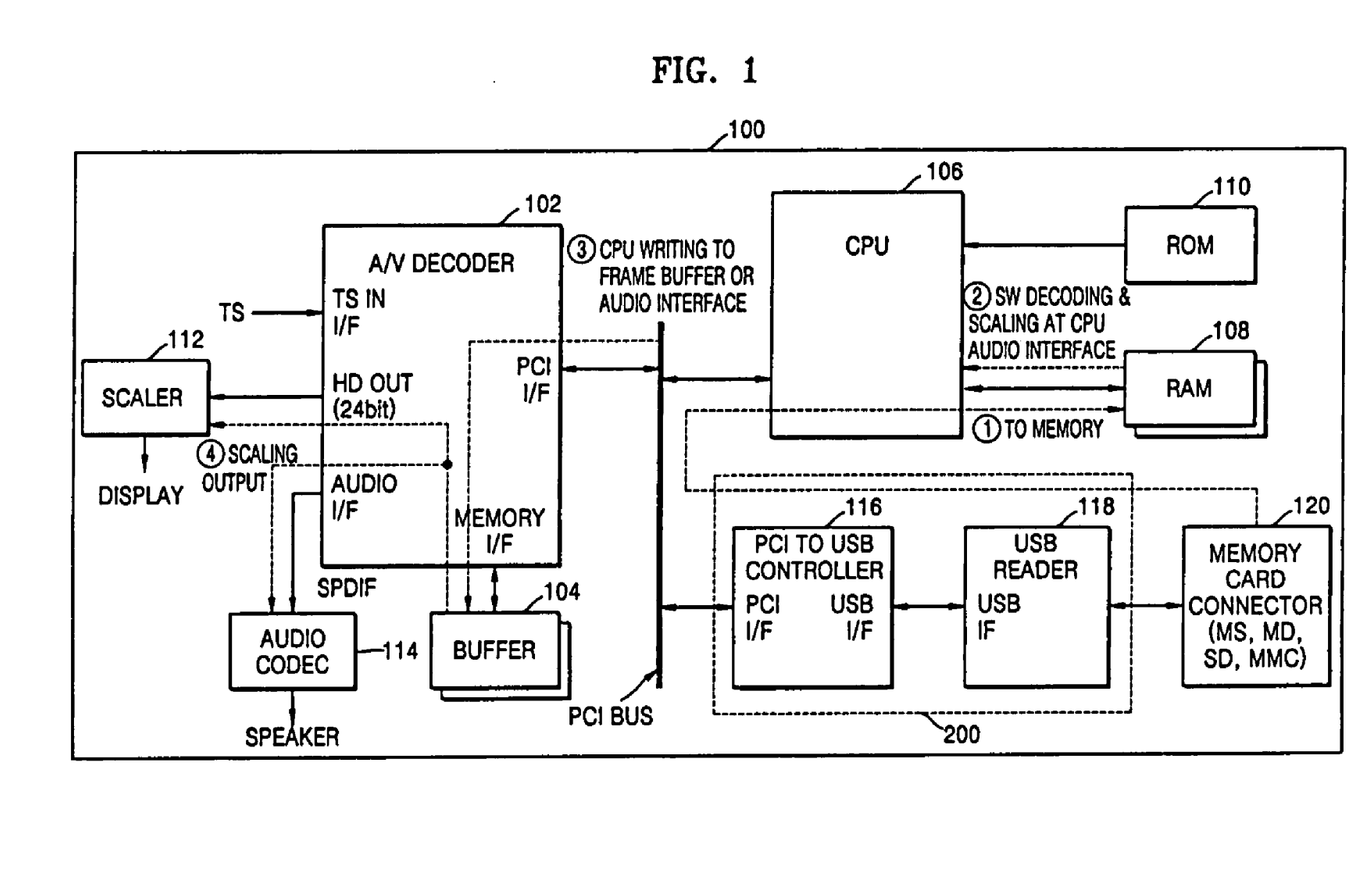
FIG. 1 is a block diagram showing a configuration of a digital audio/video (AV) apparatus, according to an embodiment of the present general inventive concept.

FIG. 1 is a block diagram showing a configuration of a digital audio/video (AV) apparatus, according to an embodiment of the present invention.

The digital AV apparatus 100 can include an AV decoder 102, a buffer 104, a microprocessor 106, a ROM 110 and a RAM 108 used by the microprocessor 106, a scaler 112, an audio codec 114, a PCI/USB controller 116, a USB reader 118, and a memory card connector 120.

The PCI/USB controller 116 and the USB reader 118 can form an additional operation processor 200 to perform additional operations. The additional operation processor 200 can be installed in the digital AV apparatus. The additional operation processor 200 can be installed in the digital AV apparatus 100 through a PCI socket.

The AV decoder 102 can receive an encoded video stream, for example, a MPEG TS (transmit stream), and can decode the same, to then output video data of each eight-bit in R/G/B and audio data. When the AV decoder 102 decodes the transmit stream (TS), the decoding operation can be controlled by the microprocessor 106. For this purpose, the AV decoder 102 and the microprocessor 106 give data via the PCI bus. The MPEG TS is provided via a digital tuner (not shown).

The video data and the audio data that is decoded by the AV decoder 102 can be stored in the buffer 104.

The program that controls the microprocessor 106 can be stored in the ROM 110.

The scaler 112 can adjust a size of a displayed picture in correspondence with a resolution of a display device, for example, a resolution of an LCD panel, and can output the adjusted picture. The output video data can be output via a display controller (not shown) and a display device (not shown).

The USB reader 118 can read data stored in a memory card (not shown) or store data in the memory card. The PCI/USB controller 116 can take charge of conversion between the USB standard and the PCI standard. A memory stick (MS), a memory device (MD), a smart media (SM), a MMC, etc., can be used as a memory card.

A memory card that stores data to use in an electronic album, for example, still image data, moving image data, etc., can be inserted into a memory card connector 120, and read out via the USB reader 118.

Also, MP3 data to perform MP3 operations can be stored in a memory card.

Data read by the USB reader 118 can be applied to the PCI bus via the PCI/USB controller 116. The microprocessor 106 can receive the data applied to the PCI bus and can store the same in the RAM 108 (which is indicated as a dotted line (①) in FIG. 1).

The microprocessor 106 can then execute an application program and process data stored in the RAM 108 (which is indicated as a dotted line (②) in FIG. 1). The microprocessor 106 can provide the processed result to the AV decoder 102 via the PCI bus.

The AV decoder 102 can store data provided from the microprocessor 106 in the buffer 104 (which is indicated as a dotted line (③) in FIG. 1). The video and audio data read from the buffer 104 is provided to the scaler 112 and the audio codec 114, respectively (which is indicated as a dotted line (④) in FIG. 1).

The digital AV apparatus 100 shown in FIG. 1 can perform the following operations for an electronic album.

Video data stored in a memory card 120 can be read via the USB reader 118 and then the read video data can be stored in the RAM 108.

The read video data can be decoded by software via the microprocessor 106. The program to decode the video data by software can be stored in the ROM 110.

The decoded result can be stored in the buffer 104.

The decoded data stored in the buffer 104 can be transferred to a display device (not shown) via the scaler 102.

The digital AV apparatus shown in FIG. 1 can perform the following operations for MP3 operations.

First, MP3 data stored in a memory card can be read via the USB reader 118 and then the read MP3 data can be stored in the RAM 108.

The read MP3 data can be decoded by software via the microprocessor 106. The program to decode the MP3 data by software can be stored in the ROM 110.

The decoded audio data can be stored in the buffer 104.

The decoded audio data stored in the buffer 104 can be transferred to an audio codec 114. The output from the audio codec 114 is output for a speaker (not shown). The audio data read from the buffer 104 can be provided to the audio codec 114, for example in a SPDiF form. SPDiF (Sony-Philips Digital Interface Format) is a digital audio interface standard for commercialized audio processing devices standardized by Sony/Philips, although any other format can be used as well.

In the digital AV apparatus shown in FIG. 1, a FIMS (Family Information Management System) operation is performed by a program stored in a ROM 110. Data for the FIMS is read from a memory card via a USB reader 118, and can then be used as necessary.

The FIMS operations can be applications such as a telephone number directory, a calendar, a memo note, and an alarm operation, or other operations which are typically used in daily life. The microprocessor 106 performs FIMS applications stored in the ROM 110 to achieve various FIMS operations required by a user.

The digital AV apparatus 199 shown in FIG. 1 may include an additional operation performing device 200 incorporated therein. The USB reader 118 included in the additional operation performing device 200 can read video data or MP3 data stored in the memory card, and the read data can be processed by the microprocessor 106. Thus, an electronic album, FIMS, and MP3 operations can be easily performed using the digital AV apparatus shown in FIG. 1.

Figure 2:
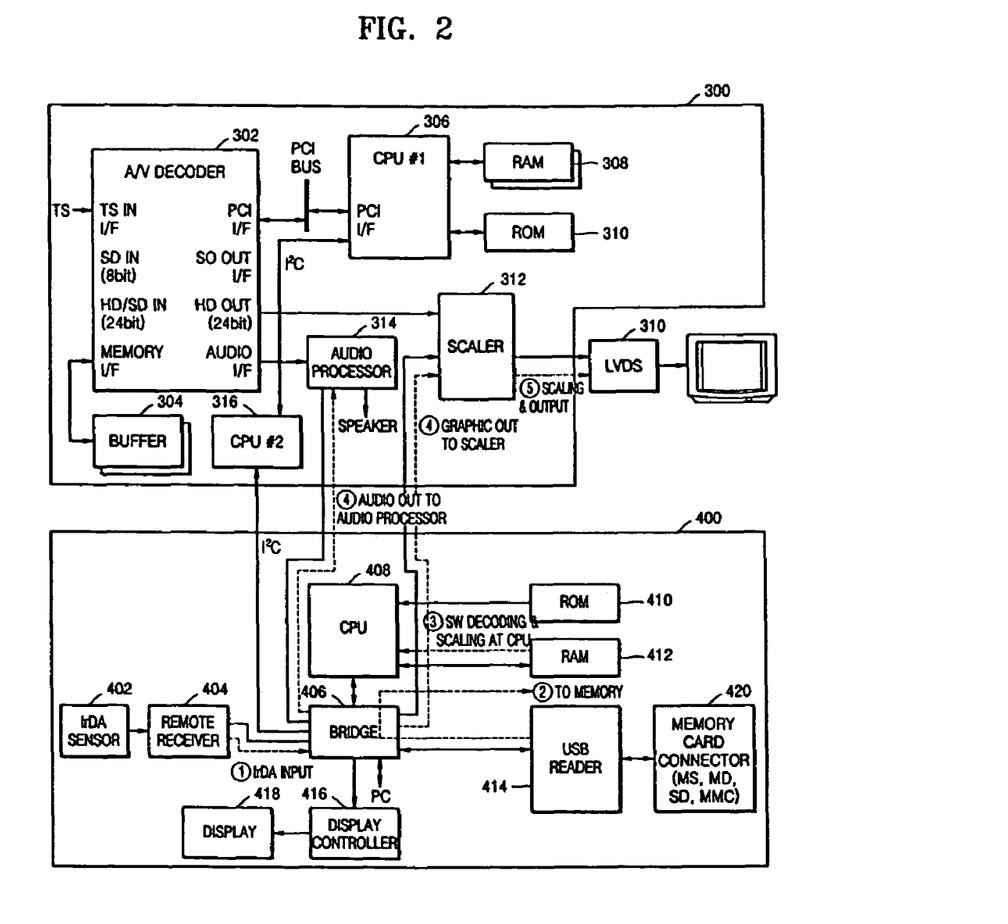
FIG. 2 is a block diagram showing a configuration of a digital audio/video (AV) apparatus and a configuration of an additional operation performing apparatus appropriate for the digital AV apparatus, according to an embodiment of the present general inventive concept.

FIG. 2 is a block diagram showing a configuration of a digital audio/video (AV) apparatus and a configuration of an additional operation performing apparatus appropriate for the digital AV apparatus, according to an embodiment of the present general inventive concept. In FIG. 2, the upper apparatus shows a digital AV apparatus 300 according to the present general inventive concept, and the lower apparatus shows an additional operation performing apparatus 400 according to the present general inventive concept.

The digital AV apparatus 300 shown in FIG. 2 can include an AV decoder 302, a buffer 304 connected to the AV decoder 302, a first microprocessor 306 (CPU#1), a ROM 310 to store programs necessary to operate the first microprocessor 306, a RAM 308 to store data processed by the first microprocessor 306, a scaler 312 to scale video data processed by the AV decoder 302 so as to be appropriate for a display 310 and to output the scaled video data, an audio processor 314 to process audio data processed by the AV decoder 302 and to provide processed audio data to a speaker (not shown), and a second microprocessor 316 (CPU#2) to control the digital AV apparatus shown in FIG. 2. Here, the second microprocessor 316 can correspond to a controller as described herein.

In the apparatus as illustrated in FIG. 2, the AV decoder 302 and the first microprocessor 306 can communicate data via a PCI bus to each other. The first microprocessor 306 can process video data of high definition (HD), and can decode the HD video data by a program that can be stored in the ROM 308.

The AV decoder 302 can receive an encoded video stream, for example, a MPEG TS (Transmit Stream), and can decode the encoded video stream, to thereby output R, G, and B video data each of 8 bits and audio data. When the AV decoder 302 decodes the TS, the first microprocessor 306 can control the decoding operation. For this purpose, the AV decoder 302 and the first microprocessor 306 can communicate data via the PCI bus to each other. The MPEG TS can be supplied to the AV decoder 302 via a digital tuner (not shown).

The video data and audio data which is decoded by the AV decoder 302 can be stored in the buffer 304.

The AV decoder 302 can receive and decode a SD (standard definition) signal, and can output the SD video data. The AV decoder 302 can also receive and decode an HD/SD video data supplied from an external source, to thereby output the HD/SD video data.

The second microprocessor 316 can control operation of the digital AV apparatus shown in FIG. 2. Each component shown in FIG. 2 can be connected to an I²C bus. The second microprocessor 316 can control other components as a master.

As is well known, the I²C bus includes a data line (SDL; serial data line) and a clock line (SCL; serial clock line). Devices can be connected in parallel with the I²C bus. Each device connected to the I²C bus which plays a role of an interface has an inherent address, and can operate as a transmitter or a receiver. Also, the devices can be regarded as a master or slave, respectively. The master is a device that starts data transmission on a bus, and generates a clock signal for transmission. Here, a device which becomes a data transmission destination becomes a slave.

When the digital AV apparatus 300 shown in FIG. 2 processes an MPEG TS, the second microprocessor 316 can hand over a control authority to the first microprocessor 306. Thus, the first microprocessor 304 becomes a master.

The scaler 314 can selectively process the video data processed by the AV decoder 302 or the additional operation video data provided from the additional operation performing apparatus 400. Also, the audio processor 314 can selectively process the audio data processed by the AV decoder 302 or the additional operation audio data provided from the additional operation performing apparatus 400, so as to be provided to a speaker (not shown).

The second microprocessor 316 can select one of the scaler 314 and the audio processor 312 to operate.

When the apparatus shown in FIG. 2 performs an additional operation, the second microprocessor 316 can receive a command from the additional operation performing apparatus 400. When the second microprocessor 316 receives a command from the additional operation performing apparatus 400, a microprocessor 408 included in the additional operation performing apparatus 400 can become a master and the second microprocessor 316 can become a slave. Also, when the second microprocessor 316 analyzes the command received from the additional operation performing apparatus 400 and controls the digital AV apparatus 300 shown in FIG. 2, based on the analyzed result, the second microprocessor 316 can become a master again. The above-described operations can be performed using a microprocessor having two ports for the I²C bus, for example, SDA555X of Samsung Electronics Co., Ltd.

The additional operation performing apparatus 400 shown in FIG. 2 can include an Ir (infrared) sensor 402, a remote receiver 404 a bridge 406, an additional operation controller 408, a ROM 410, a RAM 412, a USB reader 414, a display controller 416, a display 418, and a memory card connector 420.

The remote receiver 404 can receive a remote control command to perform an addition operation via the Ir sensor 402, and can provide the received remote control command to the additional operation controller 408 via the bridge 406. The additional operation controller 408 can perform a control operation to achieve various additional operations, in response to the remote control command provided from the remote receiver 404, or the command provided from the digital AV apparatus 300 shown in FIG. 2.

The bridge 406 can be used to enable a communications operation to be performed between at least one of the remote receiver 404 the USB reader 414 and a personal computer (PC) and the additional operation controller 408, which is a microprocessor or CPU.

The bridge 406 is typically a device to transmit data from one bus system to at least one of other bus systems.

In a computer, a north bridge and a south bridge can be mounted on a main board. The north bridge can take charge of high-speed devices such as a CPU, APAHFL, AGP, and PCI, and the south bridge can take charge of low-speed devices such as an ISA, E-IDE and USB.

The remote receiver 404 and the USB reader 414, which are connected to the bridge 406, can have a master/slave relationship with respect to the bridge 406. For example, when the remote receiver 404 transmits data to the bridge 406, the remote receiver 404 can become a master and the bridge 406 can become a slave.

The additional operational ROM 410 can store programs to control operations of the additional operation performing apparatus 400 shown in FIG. 2. The stored programs can include programs to perform an electronic album, FIMS, MP3, and digital camera operations. The ROM 410 can be implemented into a flash memory.

In the apparatus as illustrated in FIG. 2, data to perform an electronic album operation, for example, still image data and moving image data, can be stored in a memory card and read out via the USB reader 414.

The MP3 data to perform an MP3 operation can be stored in the memory card and read out via the USB reader 414.

The additional operation controller 408 can perform an operation to achieve additional operations according to a remote control command (see dotted lines indicated as ① of FIG. 2).

The video data and the MP3 data which can be read via the USB reader 414, can be temporarily stored in the RAM 412 (see dotted lines indicated as ② of FIG. 2), and processed by the additional operation controller 408 and a corresponding application (see dotted lines indicated as ③ of FIG. 2). The video data and audio data which have been processed by the additional operation controller 408 can be provided to the digital AV apparatus 300 shown in FIG. 2 via a DVI connector (see dotted lines indicated as ④ of FIG. 2).

The additional operation performing apparatus 400 shown in FIG. 2 is not integrally incorporated in the digital AV apparatus 300, but can be an externally separate apparatus, and is connected to the digital AV apparatus 300 via the DVI connector. The DVI is a standard to connect a PC and a monitor into a digital signal.

Figure 3:
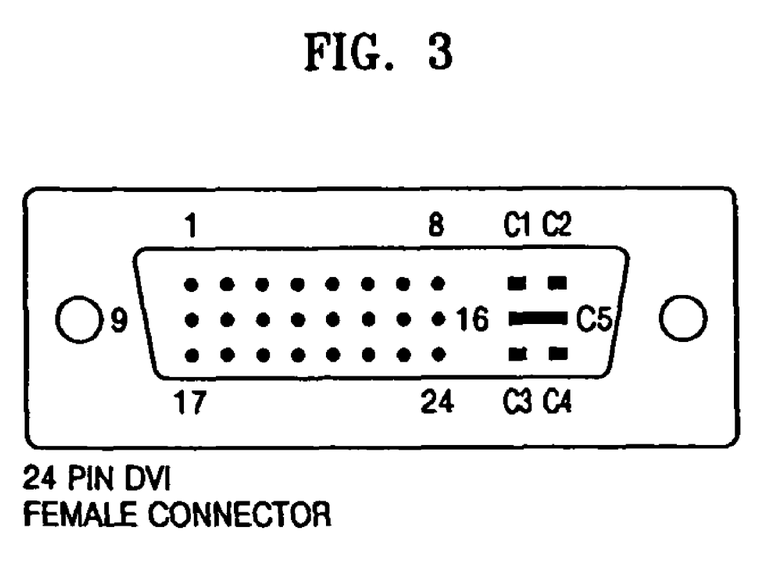
FIG. 3 shows a connector adopting the DVI-I standard, according to an embodiment of the present general inventive concept.

FIG. 3 shows a connector adopting the DVI-I standard, according to an embodiment of the present general inventive concept. There can be two types of the DVI standard. One is a DVI-D standard and the other is a DVI-I standard. The DVI-D standard transmits only digital signals and the DVI-I standard transmits both digital signals and analog signals. A connector of the DVI-D standard is composed of 24 pins, which are eight pins of three lines. A connector of the DVI-I standard further includes C1 to C5 terminals to transmit analog signals in addition to the connector of the DVI-D standard.

Table 1 illustrates an exemplary signal assigned to each pin in the DVI-I standard connector shown in FIG. 3. Here, the description of C1 to C5 terminals for analog transmission will be omitted.

TABLE 1

| Pin No | Name |
| --- | --- |
| 1 | TMDS Data2− |
| 2 | TMDS Data2+ |
| 3 | TMDS Data2 Shield |
| 4 | No Connection |
| 5 | No Connection |
| 6 | DDC Clock |
| 7 | DDC Data |
| 8 | No Connection |
| 9 | TMDS Data1− |
| 10 | TMDA Data1+ |
| 11 | TMDS Data1 Shield |
| 12 | No Connection |
| 13 | No Connection |
| 14 | +5 V Power |
| 15 | Ground (for +5 V) |
| 16 | Hot Plug Detect |
| 17 | TMDS Data0− |
| 18 | TMDS Data0+ |
| 19 | TMDS Data0 Shield |
| 20 | No Connection |
| 21 | No Connection |
| 22 | TMDS Clock Shield |
| 23 | TMDS Clock+ |
| 24 | TMDS Clock− |

In Table 1, it can be seen that seven pins such as $4^{th}$, $5^{th}$, $8^{th}$, $12^{th}$, $13^{th}$, $20^{th}$, and $21^{st}$ pins are not used. In the present general inventive concept, audio data and I²C buses are assigned to the pins which are not currently used in the DVI standard. Two pins among the seven unused pins are assigned to an I²C bus, that is, for a data line and a clock line, and five pins among them are assigned for audio data.

The apparatuses shown in FIG. 2 can perform the following operations for an electronic album.

Video data stored in a memory card can be read via the USB reader 414 and the bridge 406, and then the read video data can be stored in the RAM 412.

The read video data can be decoded by software via the additional operation controller 408. The program to decode the video data by software can be stored in the ROM 410.

The decoded video data can be transmitted to the digital AV apparatus 300 shown in FIG. 2 via the DVI connector.

The additional operation controller 408 can inform the second microprocessor 316 in the digital AV apparatus 300 that an electronic album operation is being performed. Accordingly, the digital AV apparatus 300 can allow the video data and audio data which is provided from the additional operation performing apparatus 400 to be output via the scaler 312 and the audio processor 314, respectively.

The apparatuses shown in FIG. 2 perform the following operations for MP3 operations.

MP3 data stored in a memory card can be read via the USB reader 412 and the bridge 406 and then the read MP3 data can be stored in the RAM 412.

The read MP3 data can be decoded by software via the additional operation controller 408. The program to decode the MP3 data by software can be stored in the ROM 410.

The decoded audio data can be transmitted to the digital AV apparatus 300 shown in FIG. 2.

The additional operation controller 408 can inform the digital AV apparatus 300 that an MP3 operation is being performed. Accordingly, the digital AV apparatus 300 allows the audio data, which is provided from the additional operation performing apparatus 400, to be output via the audio processor 314.

In the additional operation performing apparatus 400 shown in FIG. 2, the remote receiver 404 can receive a user remote control command and can transmit the received result to the additional operation controller 408 via the bridge 406.

When the bridge 406 gives and takes data with respect to the USB reader 414, the bridge 406 serves as a host and the USB reader 414 serves as a client. Meanwhile, when the bridge 406 gives and takes data with respect to a PC, the bridge 406 serves as a client.

The USB reader 414 can access a memory card such as a memory stick, smart media, SD, and MMC, and can read or write data from or to the memory card.

The additional operation performing apparatus 400 can include the display controller 416 and the display 418 for a user interface. The display 418 can be implemented into a LCD panel.

In the FIG. 2 apparatus, the additional operation performing apparatus 400 can be an external module which is connected with the digital AV apparatus 300 via the DVI connector. Also, the additional operation performing apparatus 400 can perform reception of a remote control command, access to a memory card, and communications with a PC.

Figure 4:
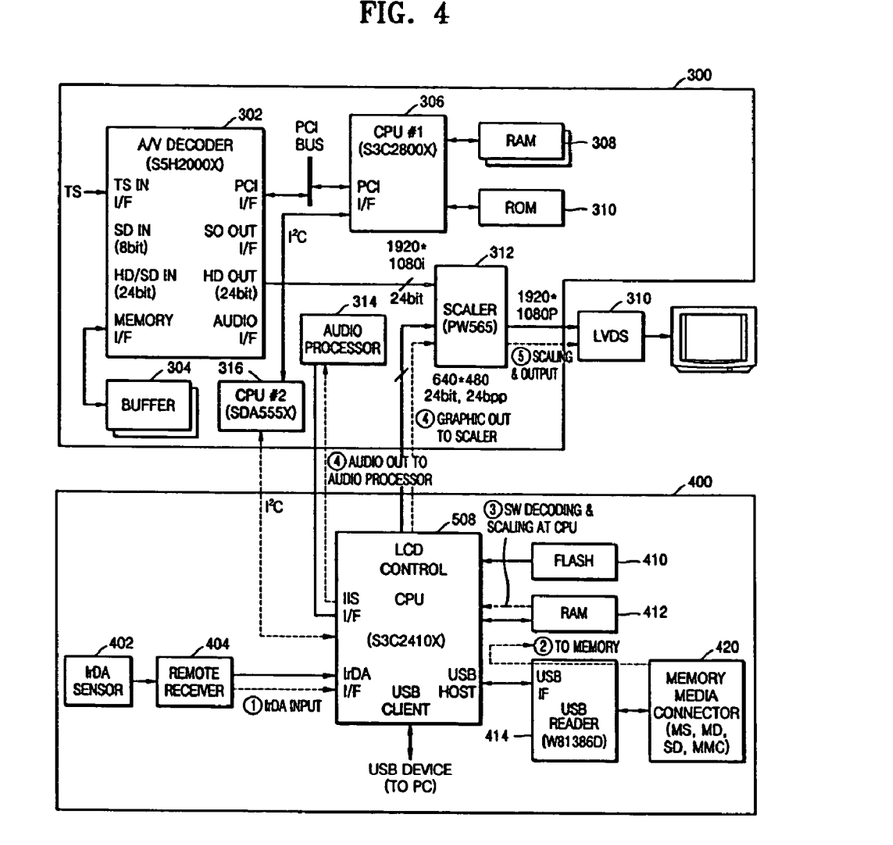
FIG. 4 is a block diagram showing the digital AV apparatus shown in FIG. 2 and an additional operation performing apparatus, according to an embodiment of the present general inventive concept.

FIG. 4 is a block diagram showing the digital AV apparatus shown in FIG. 2 and an additional operation performing apparatus, according to another embodiment of the present general inventive concept.

In the FIG. 4 apparatus, a microprocessor 508 corresponds to the bridge 406, the additional operation controller 408 and the display controller 416 which are shown in FIG. 2. As an example, the microprocessor 508 can be implemented by an S3C2410X microprocessor (CPU) from Samsung Electronics Co., Ltd.

Figure 5:
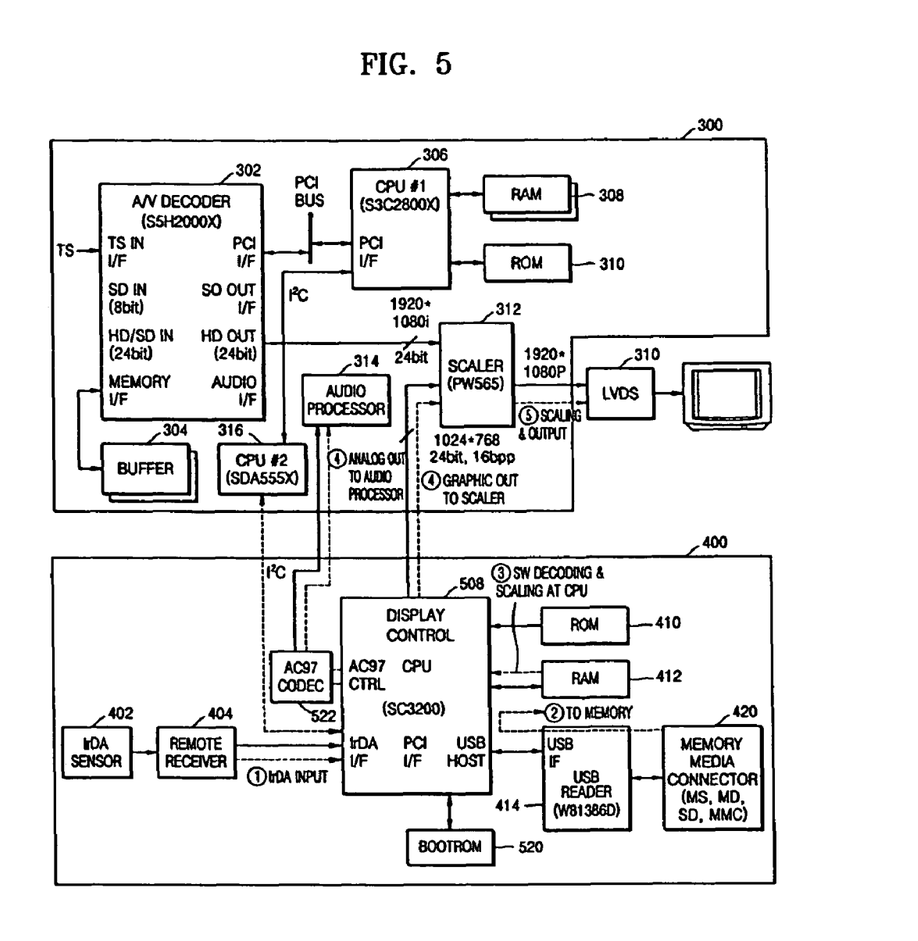
FIG. 5 is a block diagram showing a configuration of an additional operation performing apparatus, according to another embodiment of the present general inventive concept.

FIG. 5 is a block diagram showing a configuration of an additional operation performing apparatus, according to another embodiment of the present general inventive concept In the FIG. 5 apparatus, a microprocessor 508 corresponds to the bridge 406, the additional operation controller 408 and the display controller 416 which are shown in FIG. 2, and is connected with a boot ROM 520. As an example, the microprocessor 508 can be implemented by an SC3200 microprocessor (CPU) from Samsung Electronics Co., Ltd.

However, since the SC3200 microprocessor (CPU) does not provide an IIS interface for audio data, which differs from the S3C2410X microprocessor shown in FIG. 4, a codec 522 of AC97 is used to interlace audio data.

Figure 6:
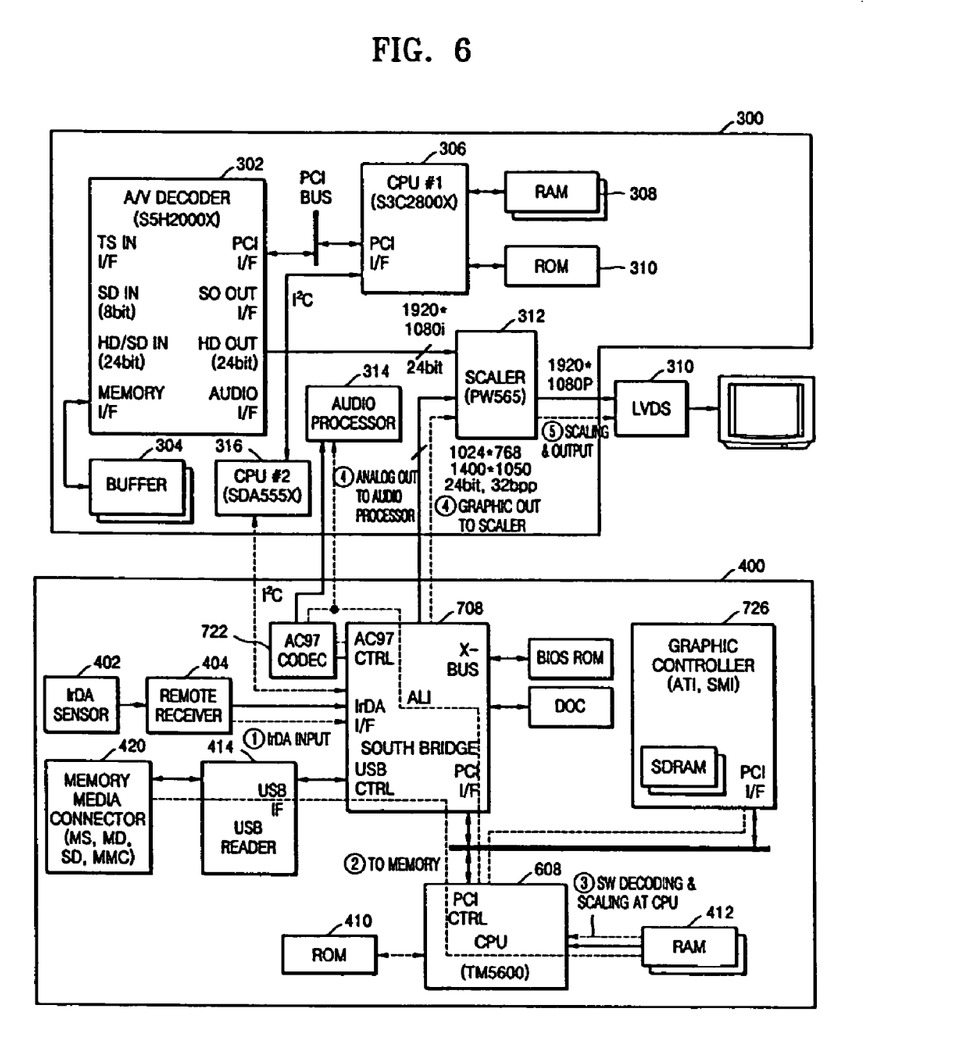
FIG. 6 is a block diagram showing a configuration of an additional operation performing apparatus, according to another embodiment of the present general inventive concept.

FIG. 6 is a block diagram showing a configuration of an additional operation performing apparatus, according to another embodiment of the present general inventive concept. The FIG. 6 apparatus uses TM5600 as an additional operation controller 608, although other controllers can be used as well. A microprocessor 708 of FIG. 6 corresponds to the SC3200 microprocessor 508 of FIG. 5.

In FIG. 6, data read via a USB reader 414 can be stored in a RAM 412. Video data which is decoded by software by the additional operation controller can be provided to a graphic controller 726 via a PCI bus 724. The graphic controller 726 provides the processed video data to the digital AV apparatus 300 shown in FIG. 2 via the DVI connector.

Since the FIG. 6 apparatus uses a separate graphic controller 726, this embodiment can provide additional operation video data of a better resolution.

Figure 7:
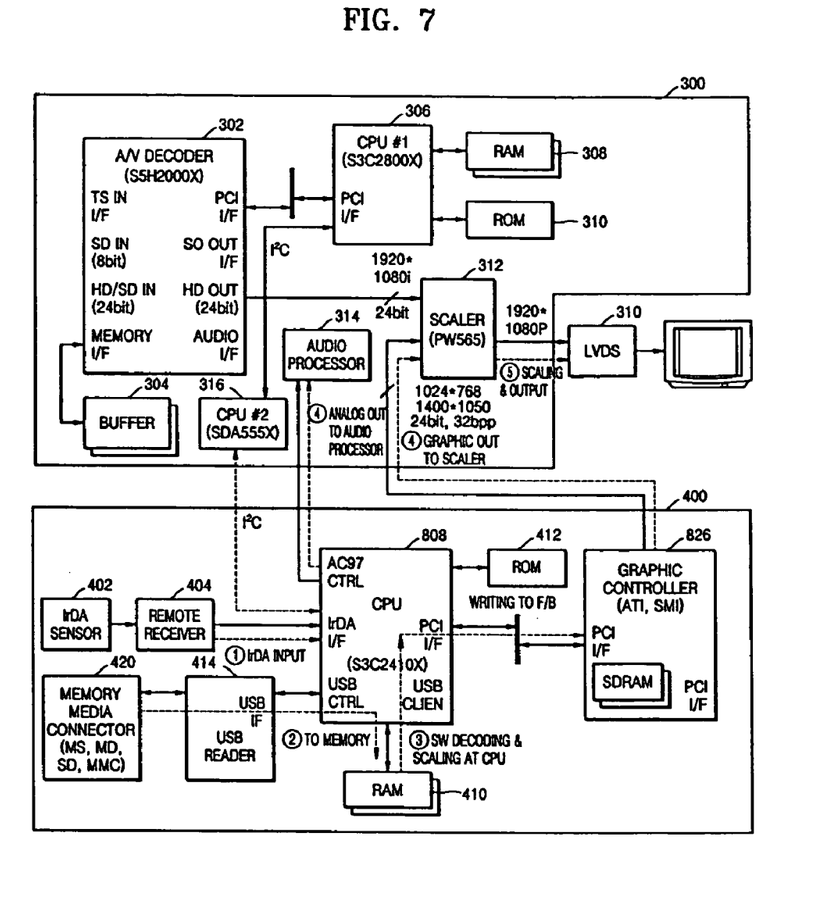
FIG. 7 is a block diagram showing a configuration of an additional operation performing apparatus, according to another embodiment of the present general inventive concept.

FIG. 7 is a block diagram showing a configuration of an additional operation performing apparatus, according to another embodiment of the present general inventive concept.

The FIG. 7 apparatus uses the S3C2410X Samsung Electronics Co, Ltd. Microprocessor (CPU) as an additional operation controller 808 as in FIG. 4, and thus can transmit additional operation video data via a PCI interface between a graphic controller 826 and the additional operation controller 808.

Figure 8:
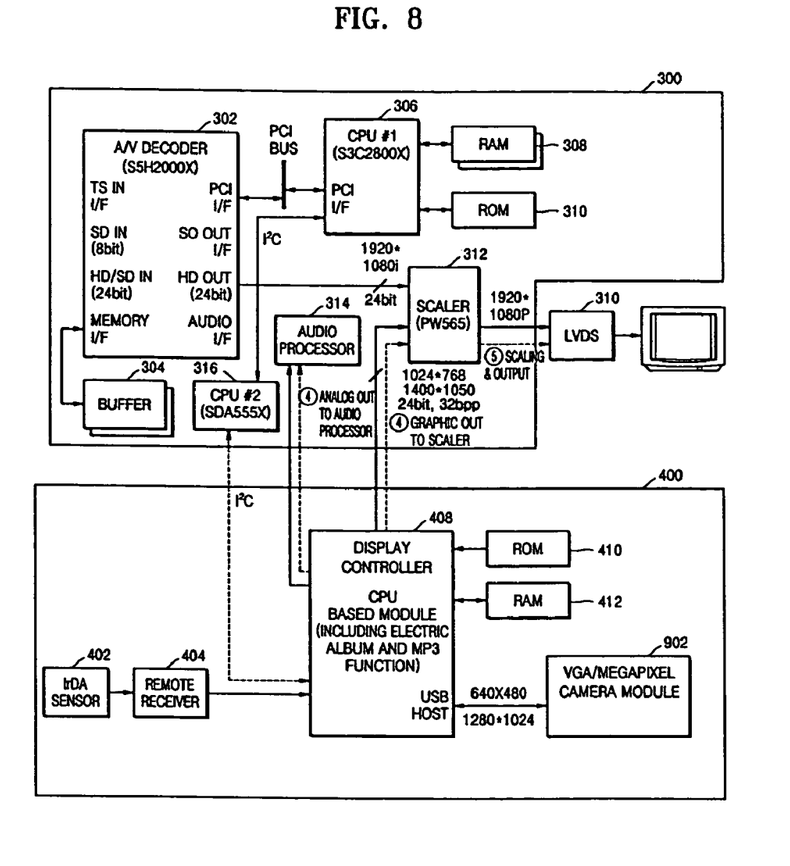
FIG. 8 is a block diagram showing a configuration of an additional operation performing apparatus, according to another embodiment of the present general inventive concept.

FIG. 8 is a block diagram showing a configuration of an additional operation performing apparatus, according to another embodiment of the present general inventive concept. The FIG. 8 apparatus is connected with a camera 902 in addition to the FIG. 4 apparatus.

The apparatuses shown in FIG. 8 can perform the following operations for camera operations.

Video data is read from the camera 902 and then the read video data is stored in a RAM 412.

The read video data can be transmitted to the digital AV apparatus 300 as shown in FIG. 2.

The additional operation controller 408 can inform the digital AV apparatus 300 that a camera operation is being performed. Accordingly, the digital AV apparatus 300 allows the video data provided from the additional operation performing apparatus 400 to be output via the scaler 312.

Since most data required to realize an FIMS operation is received from a PC, direct receiving video data from a PC can be connected with the additional operation performing apparatus 400. This can be more convenient than receiving additional operation data via a memory card which is inserted into the additional operation performing apparatus 400. Thus, the additional operation performing apparatus 400 used to achieve the additional operations needs to be easily interfaced with a PC.

Figure 9:
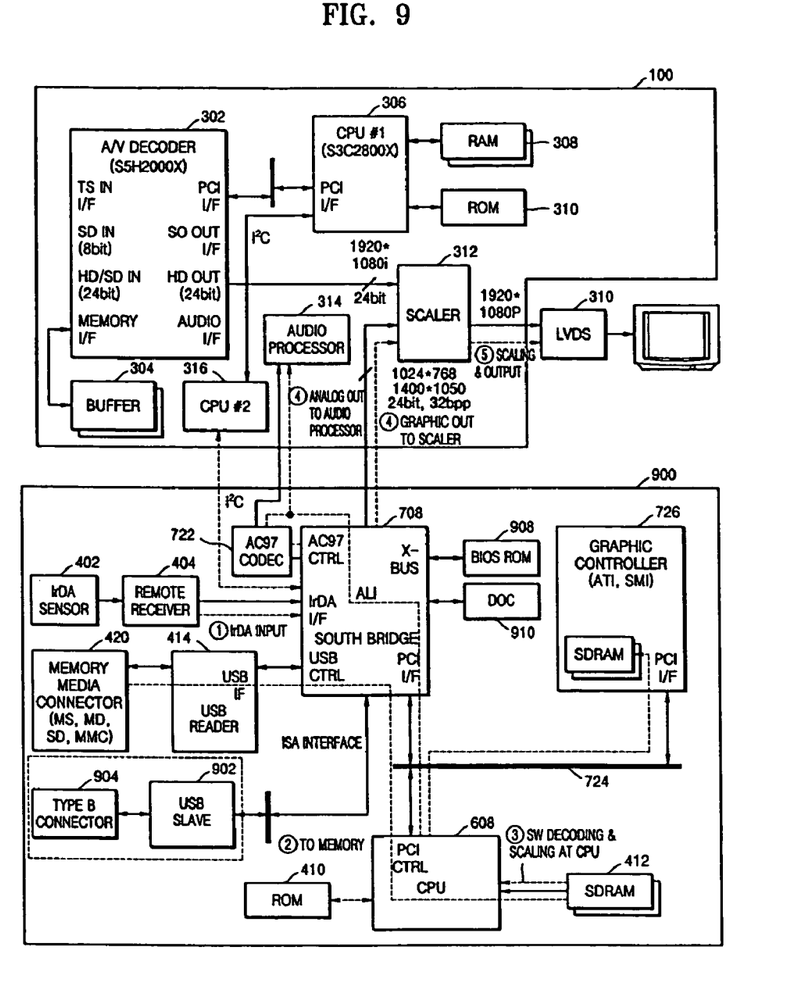
FIG. 9 is a block diagram showing a configuration of an additional operation performing apparatus, according to another embodiment of the present general inventive concept.

FIG. 9 is a block diagram showing a configuration of an additional operation performing apparatus, according to another embodiment of the present general inventive concept.

The additional operation performing apparatus 900 shown in FIG. 9 can include a USB slave 902 and a USB connector 904. The USB slave 902 can enable the additional operation performing apparatus 900 as a slave for a PC when the additional operation performing apparatus 900 is connected to a USB port of the PC.

A Type B connector can be used for the USB connector 904, although other types of connectors can be used as well.

When a FIMS operation of the additional operation performing apparatus 900 shown in FIG. 9 is established, the USB connector 904 is connected to a USB port of the PC.

The PC is connected with the additional operation performing apparatus 900 via a USB interface. Here, the PC becomes a master, and the additional operation performing apparatus 900 becomes a slave.

A USB driver to drive the additional operation module and application programs can be installed in the PC.

A user can use the application programs installed in the PC and can establish a FIMS operation of the additional operation performing apparatus 900. For example, FIMS data such as telephone numbers and alarm signals is stored in a RAM 910 in the additional operation performing apparatus 900.

The FIG. 9 apparatus can be connected with a data processing apparatus to provide a USB interface operation, for example, a PDA (personal digital assistant) as well as a PC. Further, an active sync operation can be implemented in the FIG. 9 apparatus, so that the information from a PC or PDA is automatically consistent with that from the additional operation performing apparatus 900.

As described above, the digital AV apparatus according to the present general inventive concept can result in a simple performance of various additional operations via an additional operation performing apparatus.

The additional operation performing apparatus can be connected with the digital AV apparatus via a connector, and can read data stored in a memory card to then provide the read data for the digital AV apparatus. Accordingly, the electronic album, MP3 and FIMS operations can be easily performed. Also, the additional operation performing apparatus according to the present invention is connected with a camera to thereby perform a camera operation.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A digital AV apparatus comprising:
   an AV decoder which outputs decoded video and decoded audio data;
   a first controller to control an AV decoding operation;
   a scaler to selectively adjust resolutions of decoded video data output from the AV decoder and additional information video data provided from an external video source and to output resolution-adjusted video data and resolution-adjusted additional information video data;
   an audio processor to selectively process decoded audio data output from the AV decoder and additional information audio data provided from an external audio source; and
   a second controller to receive a command provided from an external controller and to control the selection operation of the scaler and the audio processor based on the command,
   wherein the second controller acts as a master to control the scaler and the audio processor, and the second controller acts as a slave to the first controller during an AV decoding operation and to the external controller when receiving the command, and
   wherein the master is defined as a device that starts a data transmission on a bus and generates a clock signal for data transmission and the slave is defined as a device that is a data transmission destination.

2. The digital AV apparatus of claim 1, wherein the digital AV apparatus receives the additional information data through a DVI interface.

3. The digital AV apparatus of claim 1, wherein the second controller is connected to each of the first controller and the external controller.

4. A digital AV apparatus comprising:
   an AV decoder to output a decoded video signal;
   a first controller to control the AV decoder during an AV decoding operation;
   a scaler to receive and to selectively scale the decoded AV signal and an external additional AV signal, and to output a scaled output; and
   a second controller to control the scaler during a scaling operation,
   wherein the scaler includes an input to receive a command from an external controller different from the first and second controllers to control the selection operation of the scaler.

5. The apparatus as recited in claim 4, wherein the external controller is on a separate portable device from the digital AV apparatus.

6. The apparatus as recited in claim 4, wherein the external additional AV signal comprises video data.

7. The apparatus as recited in claim 4, wherein the external additional AV signal comprises MP3 data.

8. The apparatus as recited in claim 4, wherein the external additional AV signal comprises FIMS data.

9. A method, comprising:
   decoding AV data;
   receiving decoded AV data;
   receiving additional information data provided from an external audio or video source;
   selectively processing the decoded AV data and the additional information data;
   receiving a command provided from an external controller associated with the external audio or video source; and
   selectively scaling the additional information data and the decoded AV data based on the command,
   wherein the AV decoding operation is controlled by a first controller, and
   the processing of the decoded AV data and additional information data is controlled by a second controller different than the first controller and the external controller.

10. The method as recited in claim 9, further comprising treating the external commander as a master unit.

* * * * *